(12) United States Patent
Dodman et al.

(10) Patent No.: US 8,910,842 B2
(45) Date of Patent: Dec. 16, 2014

(54) EXPANSIBLE BICYCLE CARGO RACKS

(75) Inventors: Christopher P. Dodman, Basel (CH); Heath Edwin Corbet, Danbury, CT (US)

(73) Assignee: Cycling Sports Group, Inc., Bethel, CT (US)

( * ) Notice: Subject to any disclaimer, the term of this patent is extended or adjusted under 35 U.S.C. 154(b) by 283 days.

(21) Appl. No.: 13/425,783

(22) Filed: Mar. 21, 2012

(65) Prior Publication Data
US 2013/0248570 A1 Sep. 26, 2013

(51) Int. Cl.
*B62J 11/00* (2006.01)

(52) U.S. Cl.
USPC ............................................. 224/444; 24/452

(58) Field of Classification Search
USPC ............. 224/416–446, 452–457, 42.32–42.4, 224/545, 548, 549, 552, 553, 564; 248/289.11, 291.1, 186.1; 403/111, 403/120, 149
See application file for complete search history.

(56) References Cited

U.S. PATENT DOCUMENTS

| 5,040,710 | A | * | 8/1991 | Lee | ................................. | 224/416 |
| 5,482,194 | A | | 1/1996 | Hallock, III | | |
| 5,685,661 | A | * | 11/1997 | Marka et al. | .................. | 403/166 |
| 7,341,270 | B1 | | 3/2008 | Scholz | | |
| 8,074,852 | B2 | | 12/2011 | Crum, Jr. et al. | | |

FOREIGN PATENT DOCUMENTS

CN 102241260 A * 11/2011

OTHER PUBLICATIONS

Nitto Platrack—Discontinued—http://www.rivbike.com/product-p/r10.htm (1 page) Retrieved Jun. 21, 2012. Rivendell Bicycle Works 2012.
Paul—Paul compenent Engineering—http://www.paulcomp.com/flatbed.html (1 page) 1989-2012 Paul Compenent Engineering Chico California USA. Retrieved Jun. 21, 2012.
Tubus Carrier Systems; retrieved Jun. 18, 2012 (1 page); http://www.tubus.com/.
VeloOrange—VO Porteur Rack-http://store.velo-orange.com/index.php/accessories/racks-decaleurs/vo-porteur-rack.html. Retrieved Jun. 21, 2012 (1 page).

* cited by examiner

*Primary Examiner* — Justin Larson
*Assistant Examiner* — Phillip Schmidt
(74) *Attorney, Agent, or Firm* — Cantor Colburn LLP

(57) ABSTRACT

An expansible bicycle cargo rack includes a first member, a pivoting mechanism arranged on the first member, a second member arranged on the pivoting mechanism, wherein the second member is configured to rotate about the pivot mechanism between at least two positions, and an elastic member coupled between first member and the second member.

20 Claims, 11 Drawing Sheets

US 8,910,842 B2

EXPANSIBLE BICYCLE CARGO RACKS

BACKGROUND OF THE INVENTION

The subject matter disclosed herein relates to bicycle racks, and more particularly, exemplary embodiments of the present invention are directed to expansible bicycle cargo racks.

Generally, bicycles are more narrow than long. Therefore, conventional bicycle racks are limited in width to exploit simple mechanical attachment and easy use of both the rack and bicycle. These bicycle racks are of a fixed width and/or length, and generally lack any customization beyond placement location on a bicycle. As a result, for racks that are streamlined to the width of the bicycle, the size of the articles the rack may be able to hold is limited. If the rack is made wider to accommodate larger articles, then the rack may be cumbersome or get in the way when the larger size is not needed.

Accordingly, while existing bicycle racks are suitable for their intended purposes the need for improvement remains, particularly in providing a rack that may be adjusted to accommodate different size packages.

BRIEF DESCRIPTION OF THE INVENTION

According to an exemplary embodiment of the present invention, an expansible bicycle cargo rack includes a first member, a pivoting mechanism arranged on the first member, a second member arranged on the pivoting mechanism, wherein the second member is configured to rotate about the pivot mechanism between at least two positions, and an elastic member coupled between first member and the second member.

According to an additional embodiment of the present invention, an expansible bicycle cargo rack includes a base member having a first feature, a pivoting mechanism arranged on the base member, the pivoting mechanism including an elastic member, and an expanding member arranged on the pivoting mechanism and movable between a first position and a second position, the expanding member having a second feature, the expanding member being coupled to the base member by the elastic member, and wherein the elastic member is arrange to bias the first feature to engage the second feature when in the first position.

According to yet another embodiment of the present invention, a method of configuring a bicycle cargo rack includes providing a first member with a second member pivotally coupled thereto, providing an elastic member coupled between the first member and the second member, biasing the second member into contact with the first member in a first position with the elastic member, rotating the second member to a second position, and, biasing the second member into contact with the first member in a second position with the elastic member.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments of the present invention are directed to bicycle cargo racks that are expansible to accommodate a variety of items, for example, including items substantially wider than a typical maximum width of a bicycle. The technical effects and benefits of these embodiments include more efficient storage upon bicycles and increased storage capacity as compared to conventional bicycle racks.

Figure 1:
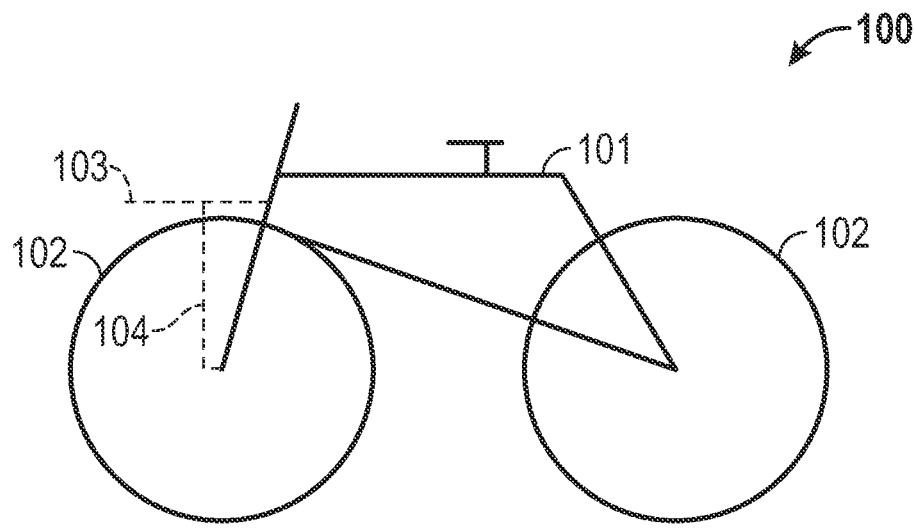
FIG. 1 depicts a bicycle with a front-mounted cargo rack.

FIG. 1 depicts a bicycle with a front-mounted cargo rack. As shown, the bicycle 100 may include a frame 101 and at least two wheels 102. Each of the at least two wheels 102 may be a single-axle wheel of any desirable diameter, width, tread pattern, and composition. In order to accommodate transport of goods on the bicycle 100, bicycle rack 103 may be mounted to both the frame 101 and front axle of wheel 102. In another embodiment, a cargo rack may be rear-mounted, as illustrated in FIG. 2.

Figure 2:
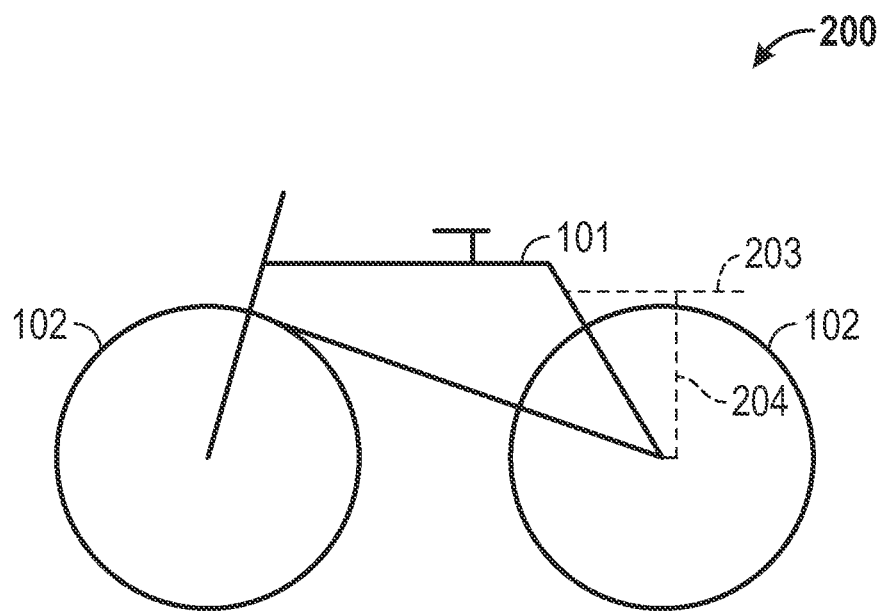
FIG. 2 depicts a bicycle with a rear-mounted cargo rack.

FIG. 2 depicts a bicycle with a rear-mounted cargo rack. The bicycle 200 is substantially similar to the bicycle 100, except having cargo rack 203 mounted to both frame 101 and rear axle of wheel 102.

According to exemplary embodiments of the present invention, cargo racks 103 and 203 may be of approximately the same neutral width of a bicycle, but also be expansible to a much wider width with relative ease. Exemplary embodiments of such expansible racks are presented and described with reference to FIGS. 3-21, below.

Figure 3:
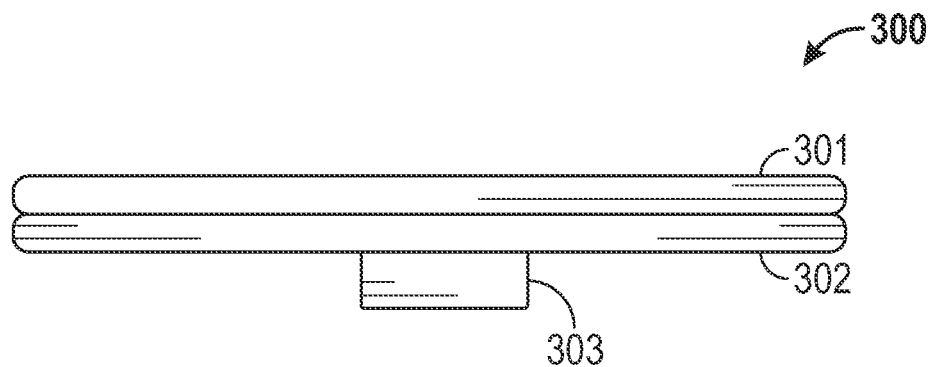
FIG. 3 depicts an expansible cargo rack, according to an exemplary embodiment of the present invention.

FIG. 3 depicts an expansible cargo rack, according to an exemplary embodiment of the present invention. The cargo rack 300 may include an expanding member 301. The cargo rack 300 may further include a base member 302 proximate the expanding member 301. The expanding member 301 and the base member 302 may be of substantially the same length and/or width. In another embodiment, the expanding member 301 may be of relatively larger length and/or width as compared to the base member 302, for example, entirely covering or obscuring the base member 302. According to yet another embodiment, the base member 302 may be of relatively larger length and/or width as compared to the expanding member 301, for example, and configured to receive and nest the expanding member 301.

Figure 4:
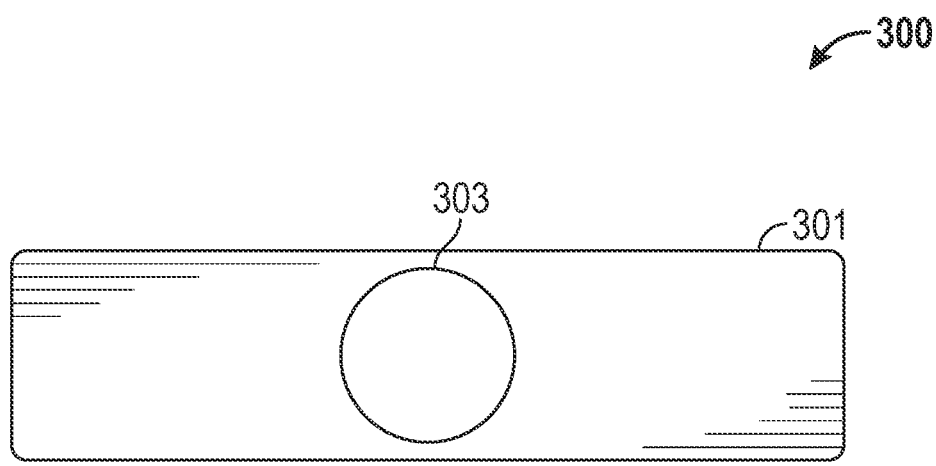
FIG. 4 is a top-view of the expansible cargo rack of FIG. 3.
Figure 5:
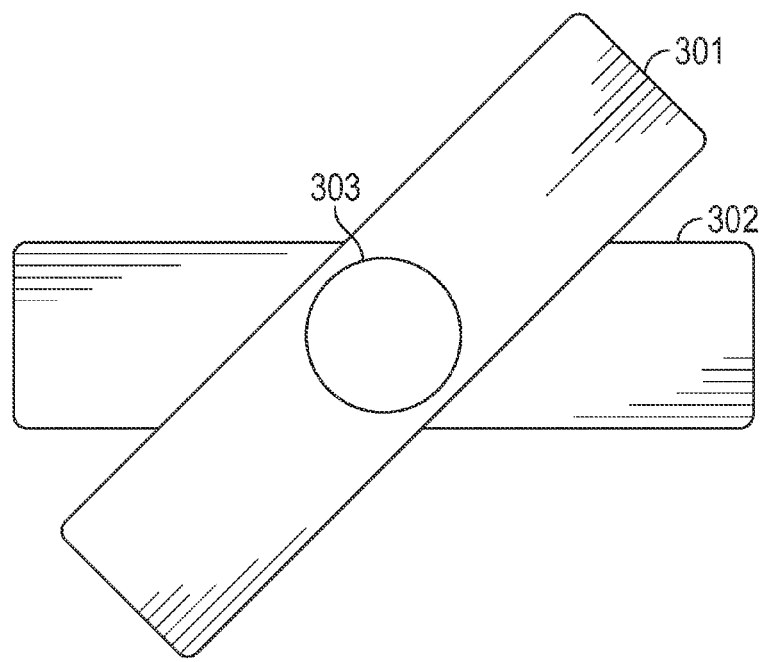
FIG. 5 is a top-view of a partially expanded cargo rack of FIG. 3.
Figure 6:
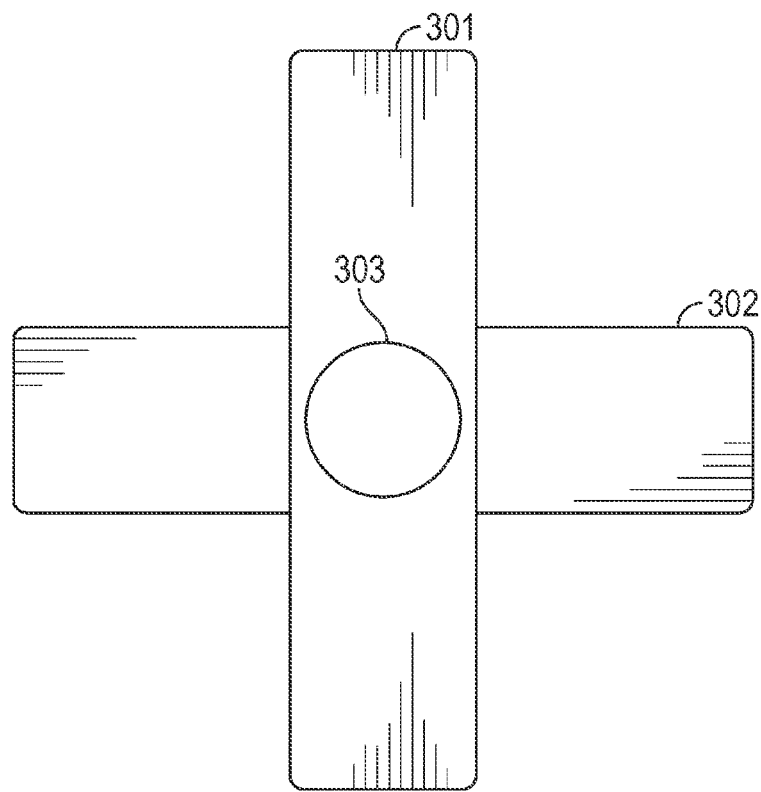
FIG. 6 is a top-view of a fully expanded cargo rack of FIG. 3.
Figure 7:
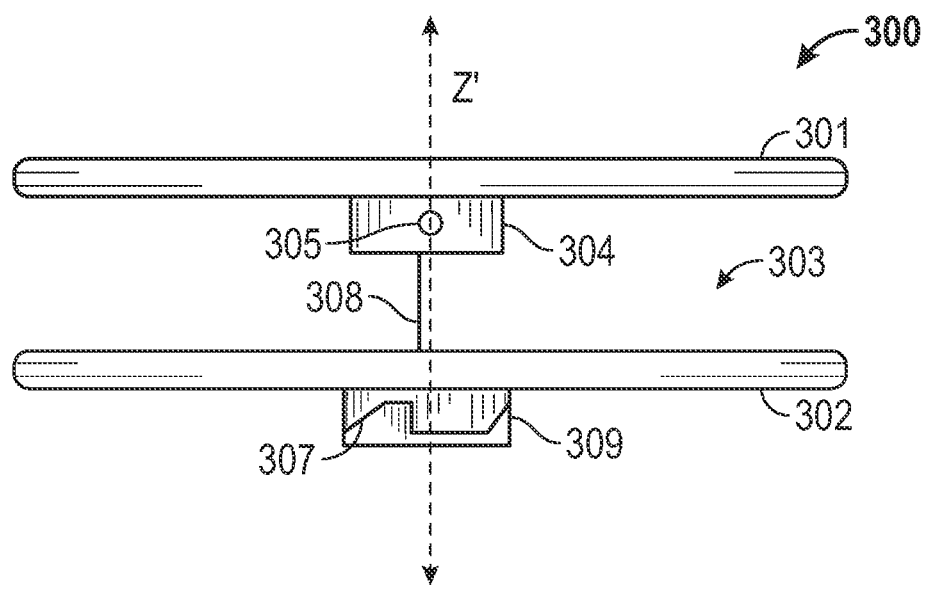
FIG. 7 is an exploded view of the expansible cargo rack of FIG. 3.
Figure 8:
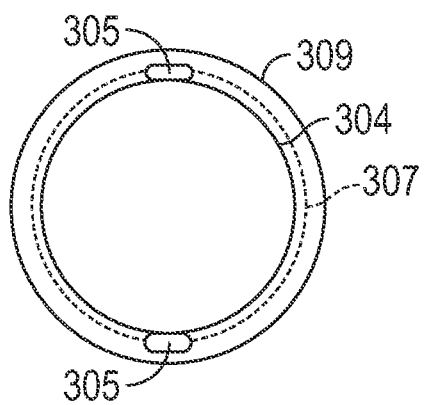
FIG. 8 depicts a pivoting mechanism of the expansible cargo rack of FIG. 3.

Turning back to FIG. 3, the expanding member 301 and the base member 302 include pivoting mechanism 303 arranged therebetween. The pivoting mechanism 303 may be a mechanism allowing for the rotation of the expanding member 301 relative to the base member 302, into at least two positions, without permitting significant separation of the two. The at least two positions include a first, locked, closed position; and a second, locked, expanded position. The rotation of the expanding member 301 between the two positions is depicted in FIGS. 4, 5, and 6. As shown, upon rotation of the expanding member 301, an overall width of the cargo rack 300 has been increased to the total length of the expanding member 301. The same may be reversed such that the expanding member 301 is rotated back to an initial position depicted in FIG. 4.

As stated above, the pivoting mechanism 303 provides for expansibility through rotation of the expanding member 301, while also restricting separation from the base member 302. For example, turning to FIGS. 7-8, an exploded view of the expansible cargo rack 300 is provided. As shown, the pivoting mechanism 303 includes a first cylindrical member 304 fixedly attached to the expanding member 301. The pivoting mechanism 303 further includes cam protrusions 305 arranged on an outer cylindrical surface of the first cylindrical member 304. The pivoting mechanism 303 further includes a second cylindrical member 309 fixedly attached to the base member 302. The second cylindrical member 309 may be arranged within or about a through-hole penetrating through surfaces of the base member 302, such that the first cylindrical member 304 may be received and engage within the second cylindrical member 309.

For example, the first cylindrical member 304 may have a first outer diameter corresponding to an outer cylindrical surface and a second outer diameter corresponding to the cam protrusions 305. The second cylindrical member 309 may have a first inner diameter slightly larger than the second outer diameter and a second inner diameter defined by a cam groove 307 slightly larger than the first outer diameter and slightly smaller that the second outer diameter. Therefore, the cam protrusions 305 may rotate about a central cylindrical axis Z' within the second cylindrical member 309 while engaging and following upward and downward cam motion of the cam groove 307. Upward cam motion (and therefore also separation) are restricted by elastic member 308 (e.g., a rubber band, bungee cord, or other elastomeric member). The elastic member 308 provides sufficient downward bias to maintain engagement of the first and second cylindrical members of the pivoting mechanism while also allowing rotation as described above. Thus, the pivot mechanism 303 is configured to convert rotation of the expanding member 301 into linear motion along an axis orthogonal to the base member 302.

Although particularly illustrated as being a traditional sawtooth cam profile, it should be understood that the cam groove 307 may be embodied by any desirable pattern allowing for appropriate upward motion of the expanding member 301 during expansion (i.e., rotation) and complementary downward motion to engage the expanding member 301 in a fully expanded position. Thus, exemplary embodiments should not be limited to the particular cam profile illustrated, but rather encompass all desirable equivalent profiles according to any particular application of the embodiments described herein.

As provided above, exemplary embodiments provide a bicycle cargo rack comprising a base member, a pivoting mechanism arranged on the base member, and an expanding member configured to engage the base member and the pivoting mechanism. The expanding member may be configured to rotate about an axis defined by a central cylindrical axis of the pivoting mechanism such that an overall width of the cargo rack is increased. Hereinafter, other embodiments of bicycle cargo racks utilizing the basic principles of expansion described above are presented and described with reference to FIGS. 9-21.

Figure 9:
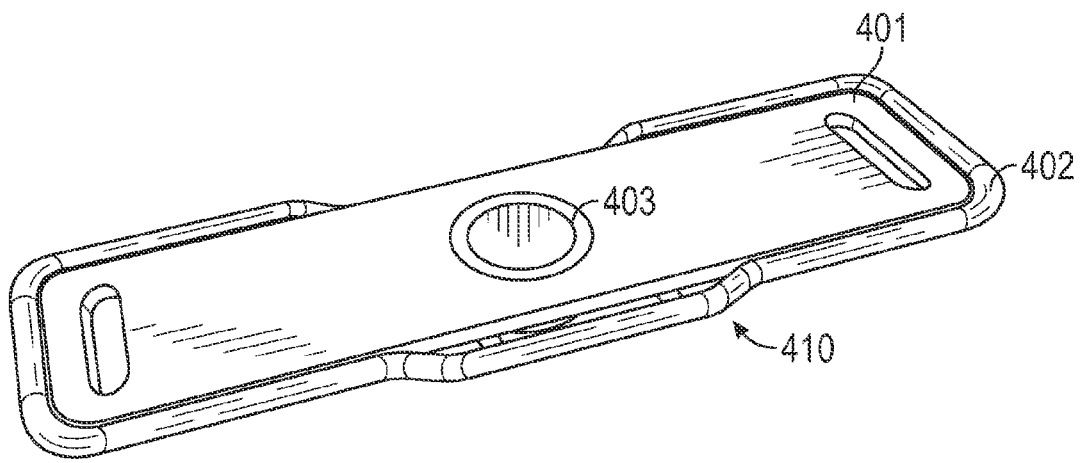
FIG. 9 is an isometric view of an expansible cargo rack, according to another embodiment of the present invention.
Figure 10:
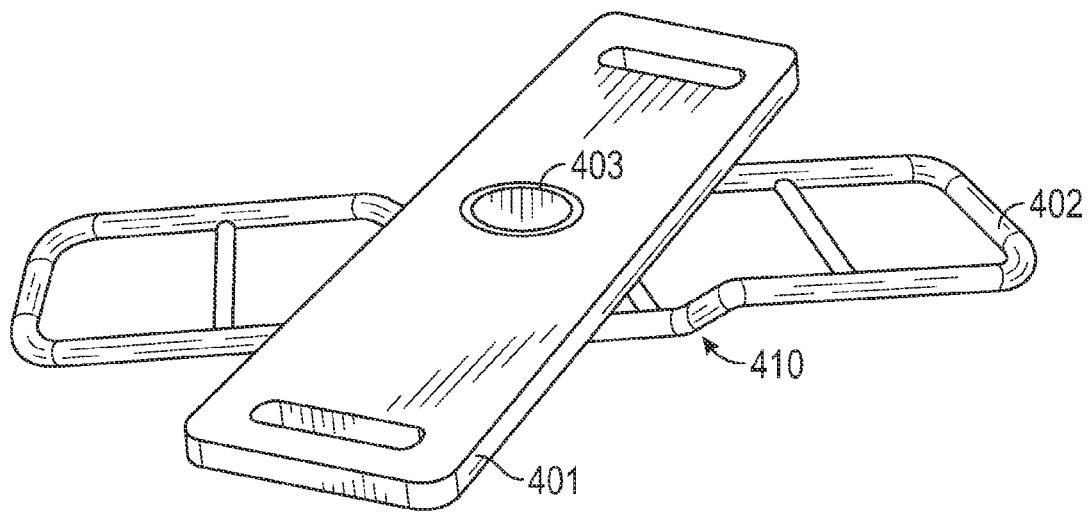
FIG. 10 is an isometric view of a partially expanded cargo rack of FIG. 9.
Figure 11:
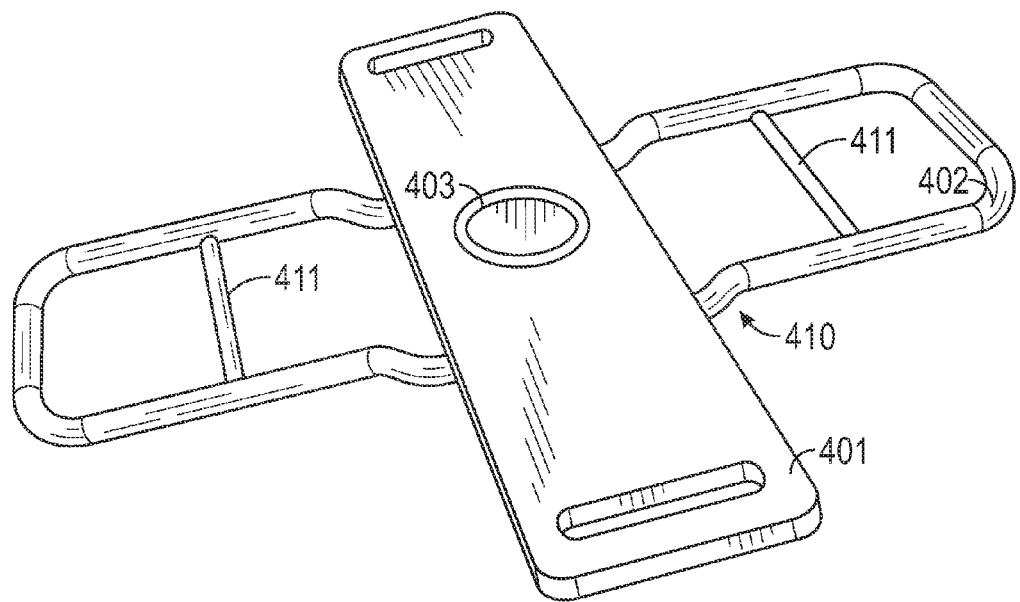
FIG. 11 is an isometric view of a fully expanded cargo rack of FIG. 9.

FIG. 9 is an isometric view of an expansible cargo rack, according to an embodiment of the present invention. As illustrated, the cargo rack 400 includes a base member 402, a pivoting mechanism 403 arranged on the base member 402, and an expanding member 401 configured to engage the pivoting mechanism 403 and the base member 402. The base member 402 also includes locking feature 410 configured to receive and engage the expanding member 401 in a fully expanded position. For example, expansion of the cargo rack 400 is illustrated in FIGS. 10-11. As shown, when fully expanded (FIG. 11), the expanding member 401 engages with locking feature 410 such that the entire cargo rack 400 is in an expanded, locked position, where the expanding member 401 is arranged orthogonal to the base member 402.

Figure 12:
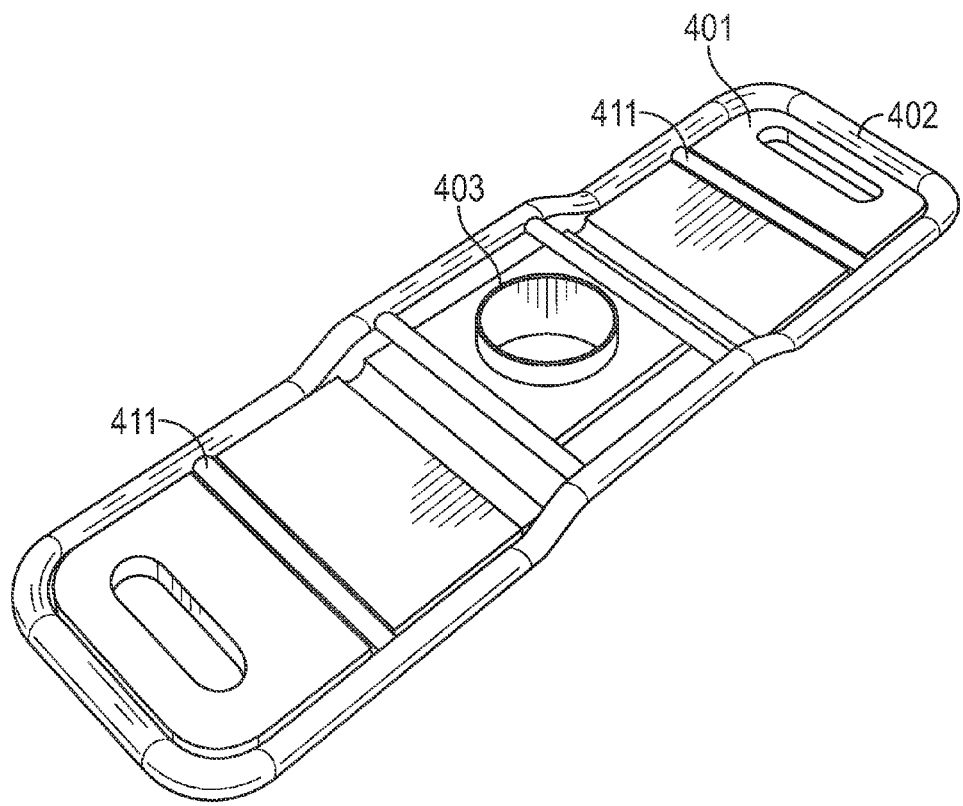
FIG. 12 is an isometric view of the expansible cargo rack of FIG. 9.

The base member 402 and the expanding member 401 also include complementary engaging features 411 configured to engage and lock the cargo rack 400 in a closed position. Turning to FIG. 12, an isometric view of the cargo rack 400 is provided illustrating the arrangement of pivoting mechanism 403 between the base member 402 and the expanding member 401, while in a closed, locked position.

Described above are several exemplary embodiments of expansible cargo racks with a substantially flat profile. It should be appreciated that the same may be varied in many ways to achieve even further functionality. Exemplary expansible cargo racks with curved and alternative profiles are described more fully below with reference to FIGS. 13-21.

Figure 13:
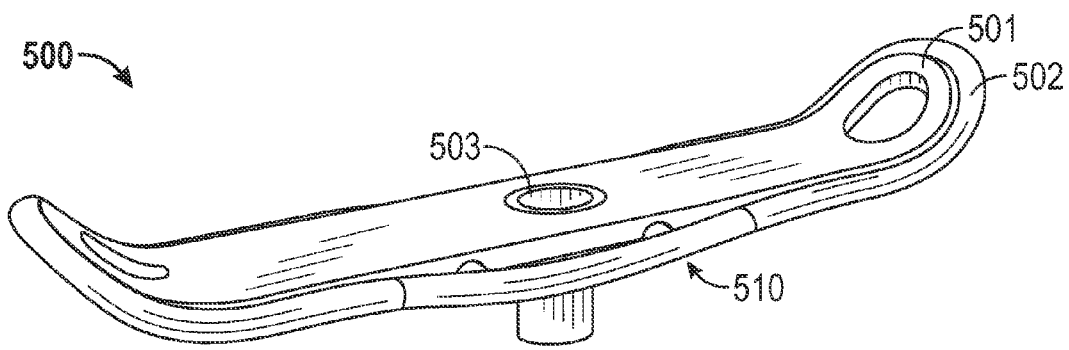
FIG. 13 is an isometric view of an expansible cargo rack, according to another embodiment of the present invention.
Figure 14:
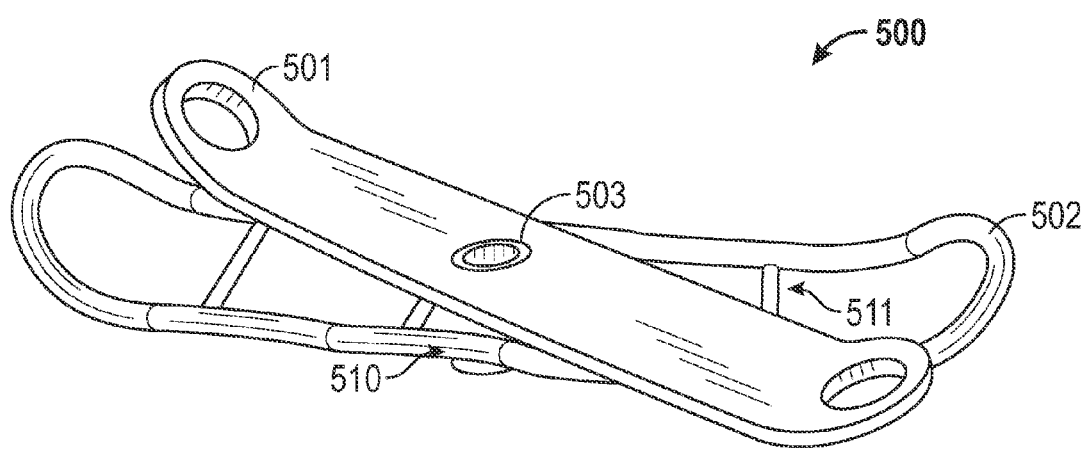
FIG. 14 is an isometric view of a partially expanded cargo rack of FIG. 13.
Figure 15:
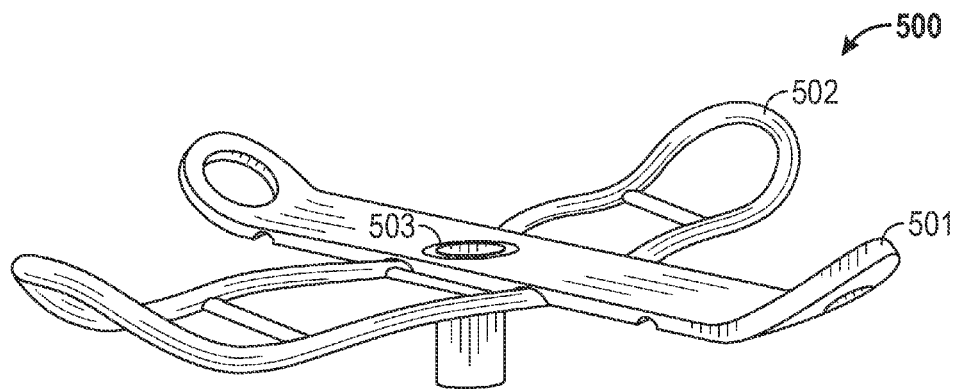
FIG. 15 is an isometric view of a fully expanded cargo rack of FIG. 13.
Figure 16:
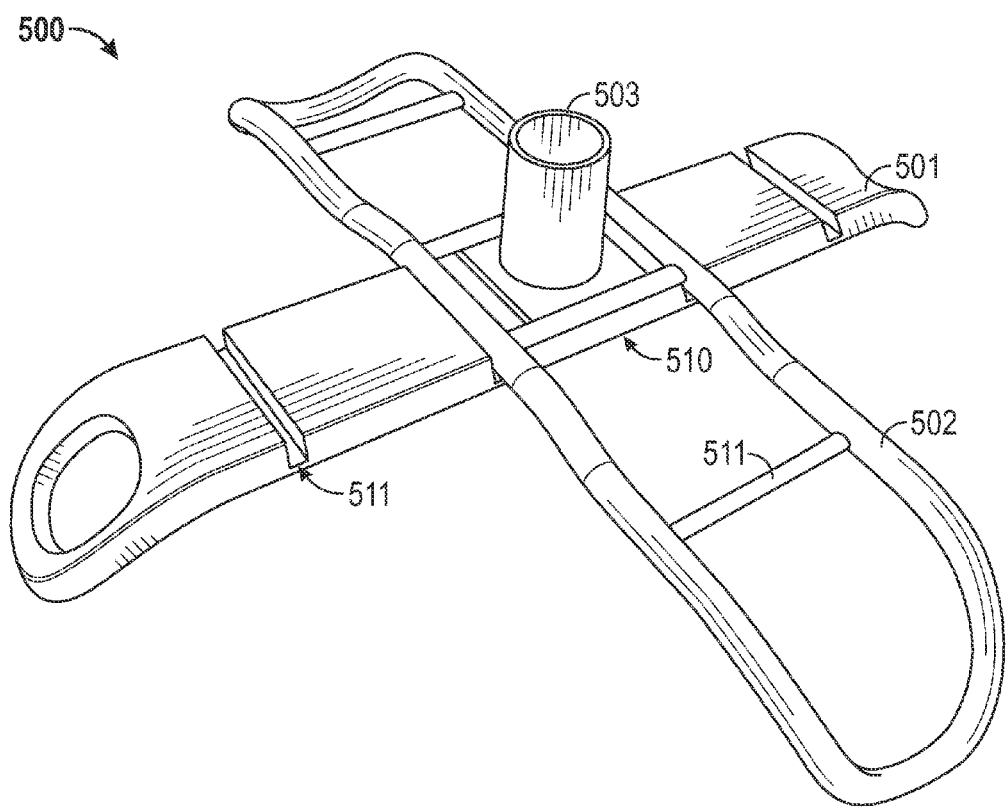
FIG. 16 is an isometric view of the expansible cargo rack of FIG. 13.

As illustrated in FIG. 13, the cargo rack 500 includes a base member 502, a pivoting mechanism 503 arranged on the base member 502, and an expanding member 501 configured to engage the pivoting mechanism 503 and the base member 502. The base member 502 also includes expansion feature 510 configured to receive and engage the expanding member 501 in a fully expanded position. For example, expansion of the cargo rack 500 is illustrated in FIGS. 14-16. As shown, when fully expanded (FIGS. 15-16), the expanding member 501 engages with feature 510 such that the entire cargo rack 500 is in an expanded, locked position, where the expanding member 501 is arranged orthogonal to the base member 502.

The base member 502 and the expanding member 501 also include complementary engaging features 511 configured to engage and lock the cargo rack 500 in a closed position. Turning to FIG. 16, an isometric view of the cargo rack 500 is provided illustrating the arrangement of pivoting mechanism 503 between the base member 502 and the expanding member 401, while in an expanded, locked position.

Figure 17:
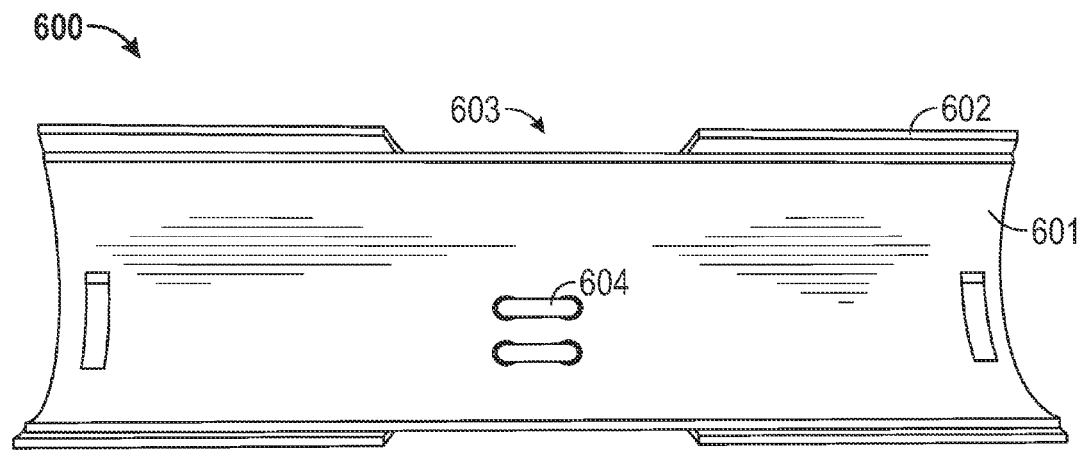
FIG. 17 is a top-view of an expansible cargo rack, according to another embodiment of the present invention.

Hereinafter another embodiment of an expansible cargo rack is described with reference to FIGS. 17-21. FIG. 17 is a top-view of an expansible cargo rack, according to another embodiment of the present invention. The cargo rack 600 includes a semi-cylindrical base member 602 configured to receive a complementary semi-cylindrical expanding member 601. Each semi-cylindrical member may be formed of complementary halves of a tube (e.g., carton tube), tubelike-structure (e.g., bamboo stalk), plastic, metal, or any other desirable material. The base member 602 includes locking feature 603 formed therethrough configured to engage and lock the expanding member 601 in a fully expanded position. Furthermore, the cargo rack 600 includes through holes 604 formed through the expanding member 601 and base member 602, configured to receive and support an elastic member (member 605, shown in FIG. 20) such as a rubber band, bungee cord, or other suitable elastomeric member.

Figure 18:
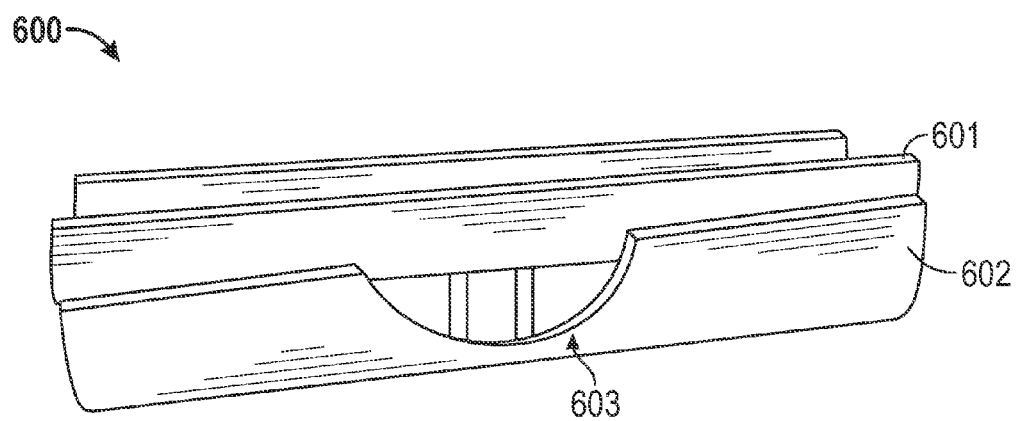
FIG. 18 is a side-view of the expansible cargo rack of FIG. 17.
Figure 19:
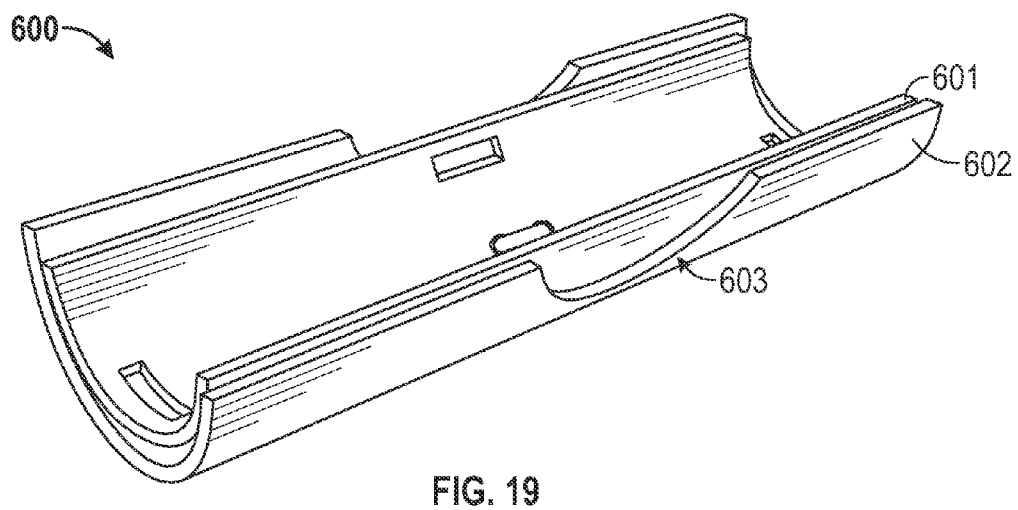
FIG. 19 is an isometric view of the expansible cargo rack of FIG. 17.

FIGS. 18 and 19 are a side-view and isometric view of the expansible cargo rack 600 better illustrating the locking feature 603. As shown, the locking feature 603 is a depression defining a shape complimentary to the cross section of the expanding member 601. Therefore, an outer surface of the expanding member 601 engages with this depression to maintain a fully expanded, locked position.

Figure 20:
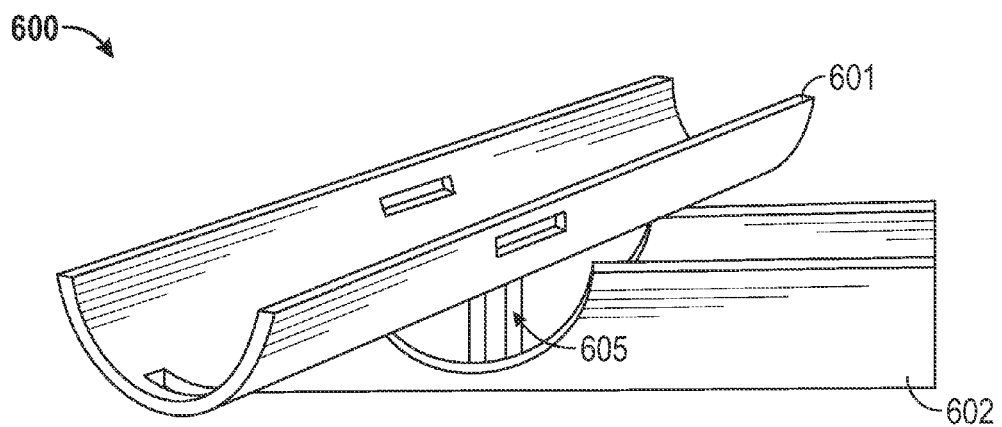
FIG. 20 is an isometric view of a partially expanded cargo rack of FIG. 17.
Figure 21:
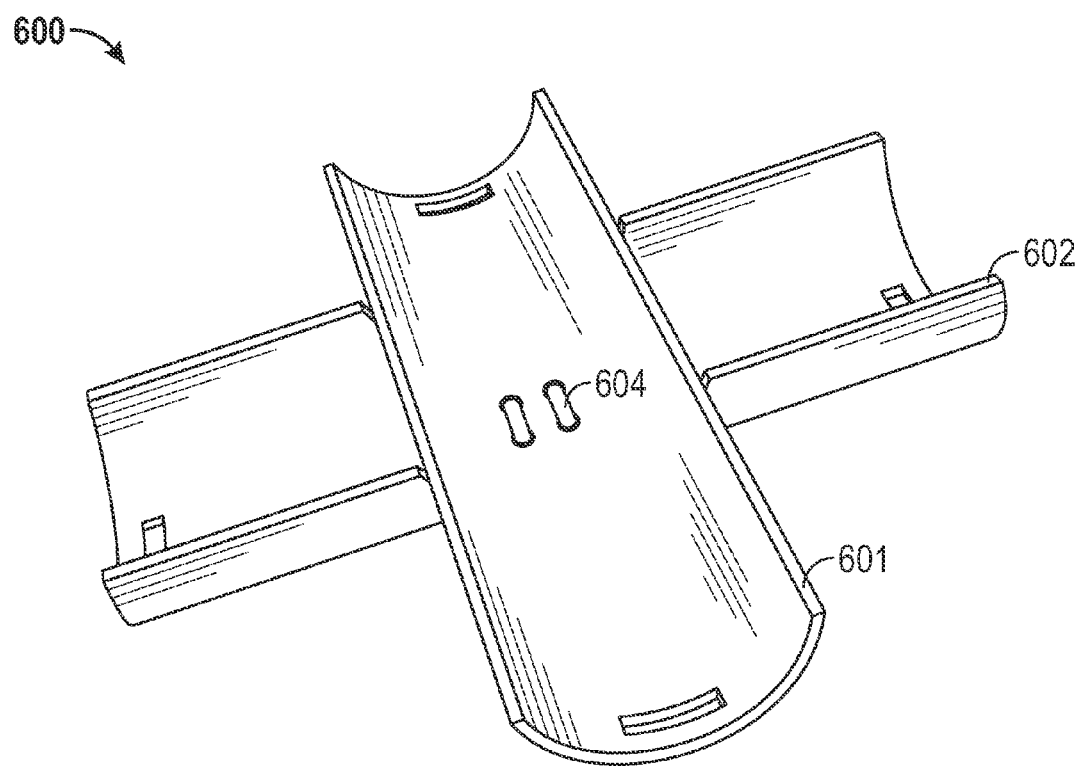
FIG. 21 is an isometric view of a fully expanded cargo rack of FIG. 17.

FIG. 20 is an isometric view of a partially expanded cargo rack of FIG. 17, better illustrating the interaction of the expanding member 601, the elastic member 605, and the base member 602. Finally, FIG. 21 is an isometric view of a fully expanded cargo rack 600, depicting the engagement of the expanding member 601 with the locking feature 603.

As described above, a plurality of exemplary embodiments of the present invention have been provided which set forth expansible bicycle cargo racks. The cargo racks may include expanding members that, when rotated about a central axis, engage and lock in a fully expanded position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A bicycle cargo rack, comprising:
a first member having a top surface defining a first plane;
a pivoting mechanism arranged on the first member;
a second member having a top surface defining a second plane, the second member being arranged on the pivoting mechanism, wherein the second member is configured to rotate about the pivoting mechanism between a first position and a second position, wherein the first plane and second plane are co-planar in the second position; and,
an elastic member coupled between the first member and the second member.

2. The cargo rack of claim 1, wherein the elastic member is configured to bias the second member to lock at the at least two positions.

3. The cargo rack of claim 1, wherein the pivoting mechanism further includes:
a first cylindrical member arranged on the second member; and
a second cylindrical member arranged on the first member, the second cylindrical member configured to receive and engage the first cylindrical member.

4. The cargo rack of claim 3, wherein the first cylindrical member includes at least one cam protrusion arranged thereon.

5. The cargo rack of claim 4, wherein the second cylindrical member includes a cam groove arranged therein, the cam groove configured to engage the at least one cam protrusion.

6. The cargo rack of claim 5, wherein the cam groove is a saw-tooth cam groove configured to convert rotation of the second member into linear motion along an axis orthogonal to the first member.

7. The cargo rack of claim 1, wherein the first member includes a first locking feature arranged thereon, the first locking feature configured to engage the second member in one of the at least two positions.

8. The cargo rack of claim 7, wherein the first member and the second member include a plurality of second locking features arranged thereon, the plurality of second locking features configured to engage each other in a second of the at least two positions.

9. The cargo rack of claim 7, wherein the first locking feature is a depression formed through the first member, wherein the second member is positioned in the depression when in the second position.

10. The cargo rack of claim 9, wherein the depression has a cross sectional shape complementary to a cross sectional shape of the second member.

11. The cargo rack of claim 1, wherein the first member and the second member are formed of bamboo.

12. The cargo rack of claim 1, wherein the first member and the second member are formed of plastic.

13. A bicycle cargo rack comprising:
a base member having a first feature, the base member having a top surface defining a first plane;
a pivoting mechanism arranged on the base member, the pivoting mechanism including an elastic member; and
an expanding member arranged on the pivoting mechanism and movable between a first position and a second position, the second position being oriented 90 degrees from the first position, the expanding member having a top surface defining a second plane, the expanding member having a second feature, the expanding member being coupled to the base member by the elastic member, wherein the first plane and second plane are co-planar in the first position and second position;
wherein the elastic member is arrange to bias the first feature to engage the second feature when in the first position.

14. The cargo rack of claim 13, wherein the pivoting mechanism further includes:
a first cylindrical member arranged on the expanding member; and
a second cylindrical member arranged on the base member, the second cylindrical member configured to receive and engage the first cylindrical member.

15. The cargo rack of claim 14, wherein the first cylindrical member includes at least one cam protrusion arranged thereon.

16. The cargo rack of claim 15, wherein the second cylindrical member includes a cam groove arranged therein, the cam groove configured to engage the at least one cam protrusion.

17. The cargo rack of claim 13, wherein the base member and the expanding member are formed a material selected from a group comprising: bamboo, plastic and metal.

18. A method of configuring a bicycle cargo rack comprising:
providing a first member with a second member pivotally coupled thereto, the first member having a top surface defining a first plane and the second member having a second surface defining a second plane;
providing an elastic member coupled between the first member and the second member;
biasing the second member into contact with the first member in a first position with the elastic member, wherein the first plane and second plane are co-planar in the first position;
rotating the second member substantially 90 degrees to a second position, wherein the first plane and second plane are co-planar in the second position; and,
biasing the second member into contact with the first member in the second position with the elastic member.

19. The method of claim 18 further comprising
providing a first feature and a second feature on the first member, the second feature being substantially perpendicular to the first feature;
providing a third feature on the second member;
engaging the first feature and the third feature when the second member is rotated to the first position; and,
engaging the second feature and the third feature when the second member is rotated to the second position.

20. The method of claim 19 further comprising moving the second member apart from the first member prior to rotating the second member.

* * * * *